(12) United States Patent
Benes et al.

(10) Patent No.: US 10,052,592 B2
(45) Date of Patent: Aug. 21, 2018

(54) HIGHLY CROSSLINKED HYBRID POLYIMIDE-SILSESQUIOXANE MEMBRANES

(71) Applicant: Universiteit Twente, Enschede (NL)

(72) Inventors: Nieck Edwin Benes, Petten (NL); Michiel Jozef Thomas Raaijmakers, Petten (NL)

(73) Assignee: UNIVERSITEIT TWENTE, Enschede (NL)

( * ) Notice: Subject to any disclaimer, the term of this patent is extended or adjusted under 35 U.S.C. 154(b) by 0 days.

(21) Appl. No.: 14/915,454

(22) PCT Filed: Sep. 2, 2014

(86) PCT No.: PCT/NL2014/050596
§ 371 (c)(1),
(2) Date: Feb. 29, 2016

(87) PCT Pub. No.: WO2015/030594
PCT Pub. Date: Mar. 5, 2015

(65) Prior Publication Data
US 2016/0199791 A1    Jul. 14, 2016

(30) Foreign Application Priority Data
Sep. 2, 2013  (EP) ..................... 13182591

(51) Int. Cl.
| | | |
|---|---|---|
| *B01D 53/22* | (2006.01) | |
| *B01D 71/64* | (2006.01) | |
| *B01D 71/70* | (2006.01) | |
| *B01D 67/00* | (2006.01) | |
| *B01D 69/02* | (2006.01) | |

(52) U.S. Cl.
CPC .......... *B01D 71/70* (2013.01); *B01D 53/228* (2013.01); *B01D 67/0006* (2013.01); *B01D 67/0079* (2013.01); *B01D 69/02* (2013.01); *B01D 71/64* (2013.01); *B01D 2257/108* (2013.01); *B01D 2257/504* (2013.01); *B01D 2257/7025* (2013.01); *B01D 2323/40* (2013.01); *B01D 2325/04* (2013.01); *B01D 2325/28* (2013.01); *Y02C 10/10* (2013.01); *Y02C 20/20* (2013.01)

(58) Field of Classification Search
CPC .............. B01D 53/228; B01D 67/0006; B01D 67/0079; B01D 69/02; B01D 71/64; B01D 71/70; B01D 2323/40
See application file for complete search history.

(56) References Cited

U.S. PATENT DOCUMENTS

| | | | | |
|---|---|---|---|---|
| 2008/0149561 A1* | 6/2008 | Chu | ...................... | B01D 69/12 210/500.38 |
| 2009/0069508 A1* | 3/2009 | Poe | ........................ | C08F 283/04 525/421 |
| 2011/0027598 A1* | 2/2011 | Wu | ...................... | C08G 73/106 428/474.4 |
| 2011/0277631 A1* | 11/2011 | Shao | ...................... | B01D 71/64 95/51 |
| 2012/0190802 A1* | 7/2012 | Poe | .................... | C08G 73/1007 525/431 |
| 2012/0277372 A1* | 11/2012 | Hu | ........................ | C08G 77/04 524/588 |

OTHER PUBLICATIONS

Asuncion, Michael Z. et al. "Silsesquioxane Barrier Materials", Macromolecules, 2007, 40, pp. 555-562.*
Kulkarni, Pallavi P., "Effect of polyhedral oligomeric silsesquioxane on gas transport properties of polyimide", 2007, Theses and Dissertations, The University of Toledo Digital Repository, Paper 1296.*

(Continued)

*Primary Examiner* — Jason M Greene
(74) *Attorney, Agent, or Firm* — Gilberto M. Villacorta; Sunit Talapatra; Foley & Lardner LLP

(57) ABSTRACT

Gaseous molecules, such as $H_2$, $CO_2$ and $CH_4$, can be separated using a hybrid organic-inorganic polyimide network membrane, wherein the polyimide contains bis-imide units of formula 1 (formula 1), wherein A represents an organic moiety having 2-22 carbon atoms; or corresponding tris-imide groups, wherein a nitrogen atom of two or more of said bis-imide units is linked to a group Q of a polyhedral oligomeric silsesquioxane (POSS) group of formula 3 $Q_m R_{(2n-m)} Si_{2n} O_{3n} \cdot x H_2 O$ 3 wherein Q is $C_p H_q$ bound to a silicon atom, R is hydrogen, hydroxy or $C_1$-$C_4$ alkyl, alkoxy, hydroxyalkyl, aminoalkyl or ammonioalkyl, bound to a silicon atom, m is from 2 up to 2n, n is from 2 up to 6, p=1 to 6; q=2(p−r) with r=0, 1, 2<p; and x is from 0 to 2n−1.

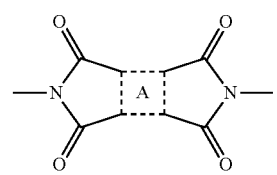

22 Claims, 1 Drawing Sheet

(56) References Cited

OTHER PUBLICATIONS

Asuncion et al., "Silesquioxane barrier materials", Macromolecules, Feb. 2007, vol. 40, No. 3, pp. 555-562.

Dasgupta et al., "Aminoethylaminopropylisobutyl POSS-polyimide nanocomposite membranes and their gas transport properties", Materials Science and Engineering B, Apr. 2010, vol. 168, pp. 30-35.

Iyer, "Gas transport properties of polyimide-POSS nanocomposites", Journal of Membrane Science, Aug. 2010, vol. 358, pp. 26-32.

International Search Report issued in International Patent Application No. PCT/NL2014/050596 dated Mar. 12, 2014.

Chern et al., "Interfacial polyfunctional condensation: Effect of the reaction conditions", Journal of Applied Polymer Science, 1991, vol. 42, pp. 2543-2550.

Chern et al., "Preparation of composite membranes via interfacial polyfunctional condensation for gas separation applications", Journal of Applied Polymer Science, 1992, vol. 44, pp. 1087-1093.

Dalwani et al., "Ultra-thin hybrid polyhedral silsequioixane-polyamide films with potentially unlimited 2D dimensions", Journal of Materials Chemistry, 2012, vol. 22, pp. 14835-14838.

De Vos et al., "High-selectivity, high-flux silica membranes for gas separation", Science, Mar. 1998, vol. 279, pp. 1710-1711.

Jiang et al., "Polyimides membranes for pervaporation and biofuels separation", Progress in Polymer Science, 2009, vol. 34, pp. 1135-1160.

Koros et al., "Elevated temperature application of polymer hollow-fiber membranes", Journal of Membrane Science, 2001, vol. 181, pp. 157-166.

Verker et al., "TriSilanolPhenyl POSS-polyimide nanocomposites: Structure-properties relationship", Composites Science and Technology 2009, vol. 69, pp. 2178-2184.

Yuan et al., "Formation-structure-performance correlation of thing film composite membranes prepared by interfacial polymerization for gas separation", Journal of Membrane Science, Dec. 2012, vols. 421-422, pp. 327-341, abstract only.

Zheng et al., "Polyimides derived from novel unsymmetric dianhydride," Macromolecules, 2000, vol. 33, No. 12, pp. 4310-4312.

* cited by examiner

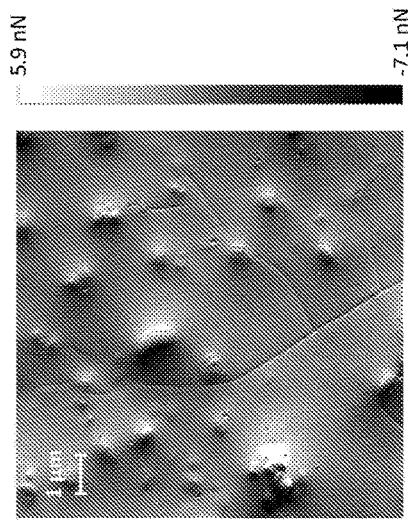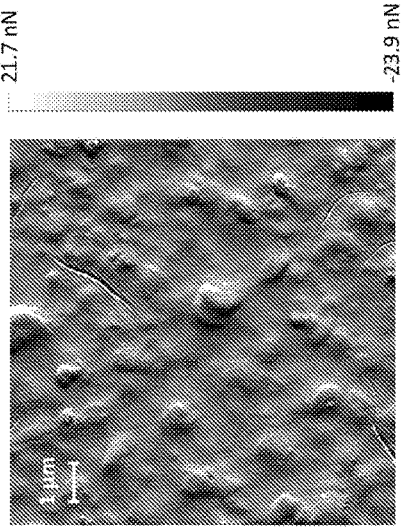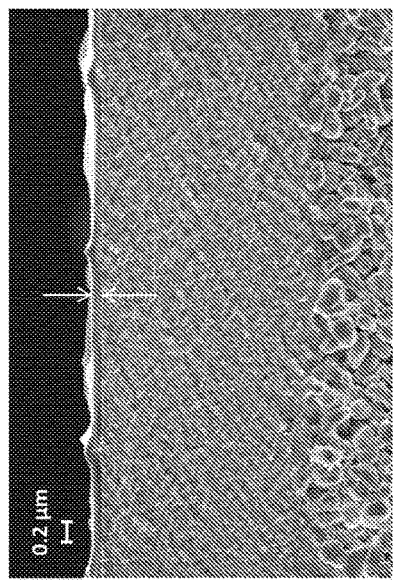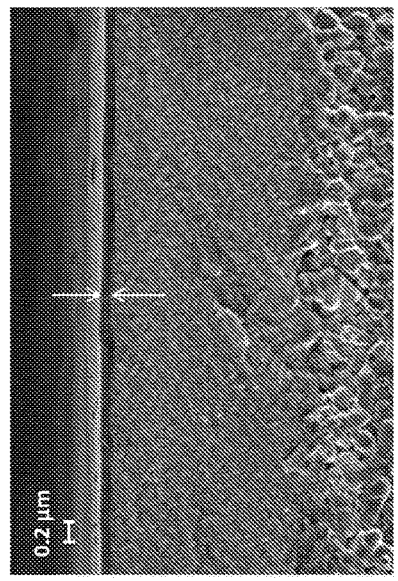
Fig. 1a
Fig. 1b
Fig. 1c
Fig. 1d

HIGHLY CROSSLINKED HYBRID POLYIMIDE-SILSESQUIOXANE MEMBRANES

CROSS-REFERENCE TO RELATED APPLICATIONS

This application is the National Phase of International Patent Application No. PCT/NL2014/050596, filed Sep. 2, 2014, published on Mar. 5, 2015 as WO 2015/030594 A1, which claims priority to European Patent Application No. 13182591.1, filed Sep. 2, 2013. The contents of which are herein incorporated by reference in their entirety.

NOTE

The work leading to this invention has received funding from the European Union Seventh Framework Programme [FP7/2007-2013] under grant agreement n° 263007, the Carena Project.

FIELD OF THE INVENTION

The invention pertains to hybrid organic-inorganic membranes which are particularly useful for high-temperature gas separation purposes.

BACKGROUND

Gas separation membranes can potentially be used in applications such as steam reforming, water-gas shift reaction and dehydrogenation of hydrocarbons. Typically these processes are operated at temperatures above 200° C. Some of these processes are typically carried out at pressures above 10 bar or even above 30 bar. For organic polymers, increased macromolecular dynamics at such elevated temperatures and/or pressures, manifested by swelling and/or plasticization, diminish membrane perm-selectivity [see e.g. Koros 2001]. Even high glass transition polymers such as polyimides and polyaramides show a sharp decrease in selectivity at temperatures above 200° C. [Koros 2001]. Polyimides are often crosslinked in order to reduce chain mobility and $CO_2$ plasticisation under demanding conditions (e.g. high pressure).

Ceramic membranes, such as amorphous silica, do not suffer from high chain mobility due to the rigidity of the silica network and show excellent gas separation properties at elevated temperatures based on molecular size exclusion [De Vos 1998]. However, difficulties in large scale processing of defect-free ceramic thin film membranes hinder application of such purely ceramic membranes. Ideally, gas separation membranes for applications at elevated temperature conditions should exhibit high permselectivity, stable selectivity and large-scale defect-free processability.

Verker et al. 2009, describe 25-30 µm thin films based on composites of polyimides and polyhedral oligomeric silsesquioxanes (POSS). In these films, the POSS are distributed randomly throughout the polymer network. On a molecular scale the POSS are not distributed homogeneously; regions exist with and without POSS molecules. The composite is devised for withstanding hypervelocity impacts.

Reaction of aminated silsesquioxanes with trimesoyl chlorides by interfacial polymerisation (water/hexane) is reported to produce ultrathin (100 nm) films supported by an organic polymeric carrier material, after a reaction time of at least 5 minutes [Dalwani 2012]. The permeance for various small molecules in the liquid phase was studied at room temperature. No selectivity in the more sensitive applications of gas separation was suggested. The membrane formation was said to be easily extendible to other organic reactants.

Interfacial polymerisation as such (of polyamines with poly(acid chlorides)) was known in the art [Chern 1991; Chern 1992].

Pervaporation properties of polyimide membranes, including a membrane based on siloxane diamine and 6FDA (hexafluoro-isopropylidene-bis(phthalic anhydride)) have been reviewed [Jiang 2009].

Imides based on octa(aminophenyl)-POSS (OAPS) and pyromellitic dianhydride can be used for producing thick (0.50 mm) nanocompositie films having oxygen barrier functions [Asuncion 2007]. The gas permeability is thus expected to be extremely low for this type of films, which rules them out for the use of selective gas transport in membrane separation. The imides are produced in a homogeneous (N-methyl-pyrrolidone) medium. Mixing OAPS into polyimide based on a fluorinated dianhydride (6FDA) and m-phenylenediamine (MDA) affects the gas transport properties of the polyimide membrane [Iyer 2010]. The POSS units of these mixed membranes are not an intrinsic part of the polyimide molecules. Nanocomposite membranes carrying mono-valent POSS units at the terminal positions of a polyimide also affect gas transport properties of the resulting thick (0.1 mm) membranes [Dasgupta 2010]. None of these prior art polymer membranes are alternating copolymers having the POSS units as repeating parts thereof, allowing to obtain ultrathin structures having effective gas separating properties under severe conditions (high temperatures and/or pressures).

There is a need for economically viable membranes which retain acceptable gas permeabilities and gas separation selectivities at more extreme operation conditions such as elevated temperatures and/or pressures, while avoiding deterioration of the performance of the membranes as a result of swelling or softening. The membranes as described above do not fulfil these requirements. Hence, an objective of the present invention is to develop gas separation membranes which exhibit these properties.

DESCRIPTION OF THE INVENTION

Surprisingly, it was found that specific hybrid organic-inorganic polyimide membranes containing (polyhedral oligomeric) silsesquioxane (POSS) units fulfil these requirements. In the POSS-polyimide membranes of the invention, the POSS are integral part of the network: without POSS no network, and the POSS are present in high concentrations. As the network consists of alternating POSS molecules and organic precursors, the POSS are distributed homogeneously on a molecular scale by definition. This structural characteristic of multivalent POSS units alternating with di- or trivalent imide-carrying structures was found to be a key feature for obtaining ultrathin structures having effective gas separating properties under severe temperature and pressure conditions. This alternating structure constitutes a clear distinction with the prior art membranes which are essentially fully organic polyimides to which a relatively small amount of POSS has been added, which may or may not be linked as a side group to the polymeric backbone.

The invention thus pertains in particular to hybrid organic-inorganic polyimide membranes, with nanoscale distribution of organic and inorganic constituents, wherein the polyimide contains organic bis-imide units of formula 1

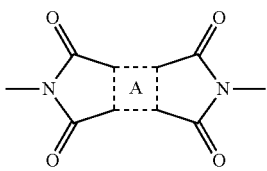

wherein A represents an organic moiety having 2-22 carbon atoms; and/or tris-imide units of formula 2

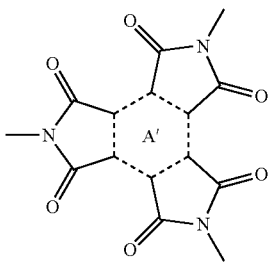

wherein A' represents an organic moiety having 6-22 carbon atoms;

wherein a nitrogen atom of two or more of said bis-imide units or tris-imide units is linked to a group Q of an polyhedral oligomeric silsesquioxane (POSS) group having an inorganic core, the POSS having formula 3

$$Q_m R_{(2n-m)} Si_{2n} O_{3n} \cdot x H_2O \qquad 3$$

wherein

Q is $C_p H_q$ with p=1 to 6, and q=2(p−r) with r=0 to 4 and r≤p, Q being bound to a silicon atom, R is hydrogen, hydroxy or $C_1$-$C_4$ alkyl, alkoxy, hydroxyalkyl, aminoalkyl or ammonioalkyl, bound to a silicon atom, m is from 2 up to 2n, preferably from 3 up to 2n, n is from 2 up to 6, and x is from 0 to 2n−1.

The term "polyhedral" is to be understood herein as a structure in which the at least 4 silicon atoms are arranged in a non-linear, i.e. (poly)cyclic or cage-like arrangement. Particular interesting polyhedra include tetrahedron, hexahedron (cube), octahedron, and the like. In the intact polyhedral POSS structure, the silicon atoms are connected to each other by —O— links. In the final structure, part of the Si—O—Si links may be hydrolysed to two silanol (SiOH) groups, by the formal addition of water, which is represented by "H$_2$O" in the above formula 3. This H$_2$O therefore does not (necessarily) represent a water molecule as such. While such a structure in which a part of the SI—O—Si links is hydrolysed, will strictly speaking no longer be polyhedral, it is still referred to as polyhedral for the purpose of the defining the silsesquioxane part of the molecules of the invention.

The resulting polyimide has a structure having repeating units which can be represented by formula 4 for the poly-bisimides:

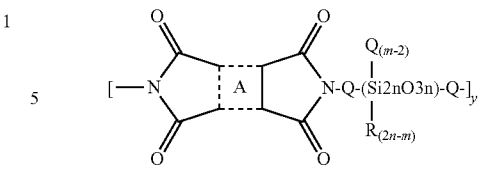

wherein A, Q, R, m and n are as defined above and each $Si_{2n}O_{3n}$ group may carry x H$_2$O molecules representing x (=from 0 up to 2n−1) Si—O—Si bonds being hydrolysed to two silanol (SiOH) groups as described above. The remaining (m−2) groups Q (if any) may be bound to other bis-imide or tris-imide units of formula 1 or 2, thus forming crosslinks in a polymer network, or may be terminated with e.g. amino or hydroxyl groups. The structure resulting from the crosslinks is three-dimensional in nature and extends into macroscopic scales, e.g. 1×1×10$^{-5}$ meter. The number of repeating units y may be between 2 and quasi infinity, e.g. >10$^6$ or preferably >10$^8$. For the poly-tris-imides the same applies, but then based on formula 2. The tris-imide units themselves also contribute to a crosslinking of the polymer network. It is preferred that at least part of the imide units are bis-imide units. So the (molar) ratio of tris-imide units of formula 2 to bis-imide units of formula 1 is generally from 1:0 to 0:1 (including the presence of only bis-imide units or of only tris-imide units), preferably from 0.5:0.5 to 0:1, most preferably from 0.2:0.8 to 0:1.

In the bis-imide units of formula 1 and tris-imide units of formula 2, as well as in the repeating units of formula 4, the two (or three) cyclic imide groups may be five-membered or six-membered rings, in particular pyrrolidinedione (succinimide), pyrrolinedione (maleimide), piperidinedione (glutarimide) or dihydropyridinedione (glutaconimide), depending on the level of unsaturation. The symbol A represents any organic moiety linking the two cyclic imide groups, and may have from 2 to 22 carbon atoms, preferably from 4 to 18 carbon atoms. The symbol A' represents any organic moiety linking the three cyclic imide groups, and may have from 6 to 22 carbon atoms, preferably from 6 to 18 carbon atoms. Such organic moiety may be a hydrocarbon group of any length up to 22 carbon atoms. In a simple form, A can be ethane or ethylene, in which case the cyclic imide groups are fused to a diazabicylo-octane (or -octene) group, i.e. the diimide of ethane-1,1,2,2- or ethene-tetracarboxylic acid (dicarboxysuccinic or dicarboxymaleic acid). In another simple form, A may be a single bond between the two cyclic imide groups, i.e. the diimide of butane-1,2,3,4-tetra-carboxylic acid. Variants thereof are the diimides of pentane-1,2,4,5-tetracarboxylic acid (methylene-bis-succinimide), and 2,3-bis(carboxymethyl)butane-1,4-diarboxylic acid (bis-glutarimide).

In a preferred embodiment, the symbols A and A' represent a cyclic, e.g. aromatic group or combination of two or three of such groups linked by direct bonds (as in biphenyl), alkylidene groups (as in 2,2-diphenylpropane), carbonyl groups (as in benzophenone), oxygen atoms (as in diphenyl ether), sulfur atoms (as in diphenyl sulfide) or sulfone groups (as in diphenylsulfone). Where A or A' is a combination of two or three of said ring systems linked by alkylidene groups, the alkylidene groups may be represented by the formula (—$C_sH_{2s}$—) or they may be haloalkylidene groups (—$C_sZ_zH_{(2s-z)}$—), wherein Z is F, Cl, Br, I, preferably F of Cl, most preferably F, s=from 1 to 4, preferably 1 to 2, most preferably 1, and z=from 1 to 2s. Where s is more than 1, it is preferred that both aromatic groups are linked to the same carbon atom of the (halo)alkylidene group, such as in 1,1-ethylidene and hexafluoro-isopropylidene (2,2,2-trifluoro-1-(trifluoromethyl)ethylidene).

Suitable examples of such cyclic groups or combinations of cyclic groups are benzene, naphthalene (2,3,6,7-substituted or 4,5,8,1-substituted for bisimides or 1,2,4,5,7,8-substituted for trisimides), phenalene, fluorene, anthracene, phenanthrene, pyrene, chrysene, perylene, biphenyl, biphenylene, triphenylene, diphenyl ether, diphenyl sulfide and diphenyl sulfone, benzophenone, diphenyl $C_1$-$C_4$ alkanes, diphenoxybenzene, terphenyl, as well as analogues containing heteroatoms, such as benzofuran, dibenzofuran, dibenzodioxine, acridine, dibenzothiophene, thioxanthene, etc. The groups may be partly or wholly hydrogenated, such as in cyclobutane, cyclopentane, cyclohexane, cyclohexene, bicyclo[2.2.2]octene, tetrahydronaphthalene and the like, or they may be halogenated, such as in chlorobenzene, difluorobenzene, diphenylhexafluoropropane, etc. Also oxo groups may be present as in cyclohexanone or benzoquinone. Preferred groups include benzene, naphthalene, biphenyl, biphenylene, fluorene, diphenyl ether, diphenyl $C_1$-$C_3$ alkanes, and their hydrogenated and/or halogenated analogues. Most preferred are benzene, biphenyl, diphenyl ether and hexafluoro-2,2-diphenylpropane.

The bisimide units of formula 1 are derived from the corresponding tetracarboxylic acid dianhydrides of formula 5:

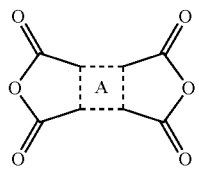

wherein A represents an organic moiety having 2-22 carbon atoms. Typical examples of dianhydrides include ethylenetetracarboxylic acid dianhydride, cyclobutanetetracarboxylic acid dianhydride, pyromellitic dianhydride, biphenyl-3,4,3',4'-tetracarboxylic acid dianhydride, 4,4'-oxy-bis(benzenedicarboxylic acid) dianhydride, etc. Mixtures of dianhydrides, resulting in polyimides with mixed bis-imide units, are also contemplated as part of the present invention.

In the bis-imide units of formula 1, the repeating polymer units of formula 4 and the anhydrides of formula 5, the organic unit A can be either symmetric, where the two cyclic imide groups are linked to two identical units, or asymmetric, where the two cyclic imide groups are linked in a different way as in the dianhydride of formula 6 (4-(3,4-dicarboxybenzoyl)naphthalene-1,8-dicarboxylic acid dianhydride) and other dianhydrides [Zheng 2000].

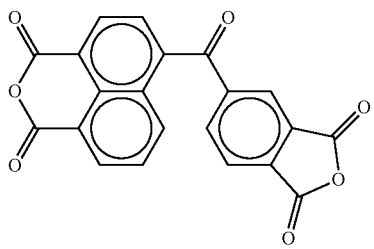

Similarly, the tris-imide units of formula 2 are derived from the corresponding hexacarboxylic acid trianhydrides.

The organic moiety A' is connected to three cyclic imide units as can be derived from e.g. mellitic trianhydride (benzo[1,2-c:3,4-c':5,6-c"]trifuran-1,3,4,6,7,9-hexaone) of formula 7, or any other trianhydride of up to 22 carbon atoms. Examples of further trianhydrides include the trianhydrides of cyclohexane-hexacarboxylic acid, aciphenalene-hexacarboxylic acid, naphthalene-1,2,4,5,7,8-hexacarboxylic acid, phenanthrenehexacarboxylic acid (e.g. 2,3,6,7,9, 10), triphenylenehexacarboxylic acid and the like.

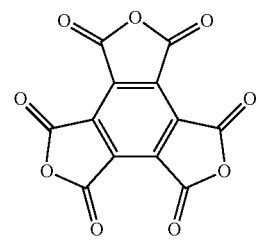

In addition to the (cyclic) imide bonds as represented in formulas 1 and 2, the polyimide membranes of the invention may also contain amide bonds, resulting in amido-imide units of formula 8 for structures corresponding to bis-imides of formula 1, wherein A is as defined above, and mutatis mutandis for structures corresponding to the tris-imides of formula 2.

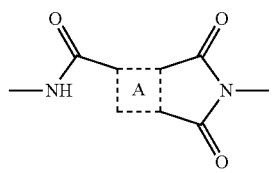

These amido-imide units can be derived from tricarboxylic anhydrides or tricarboxylic halides (or pentacarboxylic anhydrides/halides); a typical example thereof is when A is benzene, i.e. derived from trimellitic anhydride (or trimellitic anhydride chloride). The resulting membrane has a poly-amide-imide structure.

The polyhedral oligomeric silsesquioxane (POSS) groups of formula 3

$$Q_m R_{(2n-m)} Si_{2n} O_{3n} \cdot xH_2O \qquad 3$$

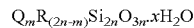

are cage-like structures wherein each silicon atom may be bridged with three other silicon atoms through Si—O—Si bonds in the cage. The fourth bond of each silicon atom is linked to either a divalent group (e.g. methylene, ethylene, 1,3-propylene, 1,4-butylene, phenylene) or a direct bond as defined for Q above, or by a terminal group R (e.g. hydrogen, hydroxy, methyl, methoxy, ethoxy, aminopropyl, etc.) as defined above. The term "ammonio" refers to protonated and/or alkylated amino groups, such as ammonio (—$NH_3^+$), trimethylammonio (—$N(CH_3)_3^+$), or diethylammonio (—$N(C_2H_5)_2H^+$), and implies the presence of a counter anion, such as chloride ($Cl^+$). At least two silicon atoms of the POSS carry a divalent group, which provides the link to the bis-imide units of formula 1 or the tris-imide units of formula 2 above. On average, preferably at least 3, more preferably at least 4 silicon atoms of each POSS unit carry a divalent group providing a link to a unit of formula 1 or 2. Most preferably, on average, at least ¾ of all silicon atoms or even all or almost all silicon atoms carry such a divalent groups (m=0 or 1). The number of silicon atoms (2n) may vary according to the particular POSS, from 4 to 12. Preferably, the final polyimide material comprises POSS cages containing six, eight, or ten silicon atoms. Most preferred number of silicon atoms is 8 (n=4).

The POSS units as present in the hybrid polyimides of the invention need not be fully intact polyhedral structures. One or more of the Si—O—Si bonds may be broken to result in two hydroxy groups, which is represented by xH$_2$O in formula 3, as long as at least two silicon atoms carrying a linking group Q per POSS unit are linked to each other through one or more Si—O—Si bonds. Preferably, however, the units remain mostly intact so that each silicon atom is on average bound to at least two, preferably to at least 2.25, and more preferably to at least 2.75 other silicon atoms through inorganic siloxane bonds: Si—O—Si. Alternatively, they remain essentially completely intact and each silicon is bound to three, or at least more than 2.9, other silicon atoms in the same POSS cage.

In any structure, each silicon atom is bound to four neighbouring atoms in total. The neighbouring (oxygen) atoms that are not present to form inorganic siloxane bonds are part of a bridge-forming moiety Q, or a terminating group R. The ratio between the bridging and terminating groups is larger than 1:3, preferably larger than 1:1 more preferably larger than 3:1 and most preferably larger than 9:1. The presence of the terminating group is optional and not essential for the formation of the network structure. It can originate from the partial breakdown of the POSS cage or it can originate from an organo-functional group that has not completely reacted to form a bridging moiety towards another POSS cage, or it can be present intentionally. The terminating groups can be selected from silanol, i.e. —OH, —R, the reaction product of R to one dianhydride.

The total bridging moiety between two POSS units, denoted as B, can be represented as Q-BI-Q, wherein Q represents the organic functionalised groups present on the corners of the POSS cages and BI represents the bis-imide groups represented by formula 1, and originating from the dianhydrides. Likewise, the tripodal bridging units between up to three POSS units, denoted as T, can represented as

also represented as Q-TI<Q$_2$, i.e. a trisimide unit of formula 2, TI, linked to three Q groups. The groups Q are typically selected from linear alkane chains C$_p$H$_q$ as defined above. In a preferred configuration this group Q can be represented by (CH$_2$)$_p$ with p=1-4.

In an alternative description the overall composition of the material equals SiO$_{(2-b-1.5t-0.5c)}$B$_b$T$_t$R$_c$ with 0<b≤0.5, 0<t≤0.33 and 0<c≤1.0. Herein B is represented by Q-BI-Q and T is be represented by Q-TI<Q$_2$ as defined above, and R is a terminating group, also as defined above, which may include a Q link. For the case that the POSS cage remains fully intact, the sum of b, 1.5t and 0.5c equals 0.5. In the completely unreacted system (no imide formation), the values for b and t are 0 and c is 1, whereas in a fully reacted system the values for b and 1.5t together equal 0.5 and c is 0 (or b is 0.5 and t and c are 0; or t is 0.33 and b and c are 0). In this case the ratio between (b+t) and c is a measure for the degree of condensation. For a polyimide structure of formula 4 wherein m=2, while n may be 4, B is at least ⅛ (0.125) with b/c>⅙ (0.167). The b/c value or (b+t)/c value is ideally as high as possible, and preferably higher than 1:4, more preferably higher than 1:1, even more preferably higher than 2:1, most preferably higher than 5:1.

In a further alternative description, the material based on bis-imides can be considered as an alternating co-polymer in which organic (bis-imide-based) parts, O, are alternated with inorganic (silica-based) parts, I. In this way chains like (—O—I—O—I—)$_n$ are formed. In the central part of the organic constituents preferably aromatic five- and six-membered rings are present. Optionally linear, alkane, parts may be present as well, especially where the organic parts are linked to the inorganic parts. An essential bond in the organic part is the imide bond consisting of two acyl groups bound to one and the same nitrogen atom as in formula 9, in which Q may be as defined above and A1 and A2 may be the same or different, thus representing symmetrical or asymmetrical systems, and may be part of a cyclic system.

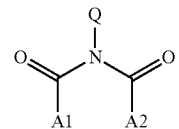

9

In a preferred embodiment, the I parts are linked to more than two O parts, i.e. on average to more than 3 or more preferably to more than 4 O parts. As a maximum, each I part is connected to 8, or close to 8, but preferably at least to 6 O parts. Alternatively or additionally, part or all of the O parts are linked to three I parts, through the presence of tris-imide as described above.

The polyhedral oligomeric silsesquioxane (POSS) groups of formula 3 are derived from the corresponding POSS polyamines with formula 10:

(H$_2$NQ)$_m$R$_{(2n-m)}$Si$_{2n}$O$_{3n}$      10 wherein Q, R, m and n are as defined above. Preferred aminoalkyl groups H$_2$NQ are aminoethyl, aminopropyl and aminobutyl, most preferred is aminopropyl. The aminoalkyl groups may be in their salt form. Various POSS polyamines are known in the art. They are stable under acidic conditions, but less stable under alkaline conditions, and hence they are preferably in an acidic form when stored. Instead of the amines of formula 10, the groups of formula 1 or 2 can also be derived from the corresponding isocyanates having the formula 10a:

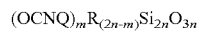

(OCNQ)$_m$R$_{(2n-m)}$Si$_{2n}$O$_{3n}$      10a which can react with the dianhydrides or trianhydrides to form the same imides by net expulsion of a molecule of CO$_2$ instead of a molecule of H$_2$O in case of amines reacting with the dianhydrides.

The molar ratio of the bis-imide units of formula 1 and/or tris-imide units of formula 2 to POSS units of formula 3 in the polyimides of formula 4 and in the membranes of the invention may vary. For a POSS wherein n=4 and m=0 (8 Si atoms, all carrying a divalent group), the ratio is 4 for bis-imide units and 2% for tris-imide units, if all groups react. In that case the ratio of bis-imide units of formula 1 to silicon atoms is 0.5 (0.33 for tris-imide units). In practice it is sufficient for obtaining an effective membrane if the ratio of units of formula 1 to silicon atoms is at least 0.25, preferably between 0.3 and 0.45, or if the ratio of units of formula 2 to silicon atoms is at least 0.17, preferably between 0.2 and 0.3.

The membrane of the invention can be ultrathin. The preferred thickness is from 20 nm up to 500 nm, preferably between 30 and 300 nm, more preferred between 50 and 200 nm. The membrane can be a free-standing membrane. If desired, the free-standing membrane, i.e. membrane having no further porous layers, can be deposited on a dense (non-porous) support.

In one embodiment, the membrane of the invention is supported by a porous support. Preferably, this support is mesoporous (pore diameter between 2 and 50 nm) or microporous (pore diameter<2 nm). Suitable materials comprise materials such as gamma-alumina, titania, zirconia, organic-inorganic hybrid silica and the like. Suitable materials for macroporous supports (pore diameter above 50 nm) include alpha-alumina. Alternatively, the supports are metallic and may be selected from iron, steel, and stainless steel.

The membranes of the invention can also be supported by an organic polymer support, which can be a thermoplastic or quasi thermoplastic organic polymer capable of forming porous layers, such as sheets, tubes and the like, and having sufficient heat resistance during the thermal treatment step in manufacturing and having sufficient strength and chemical resistance under the operational conditions. This means that the preferred polymeric support material will depend on the ultimate application. The skilled person will be able to select the appropriate support material on the basis of his general knowledge. Suitable examples include polyacrylonitrile (PAN), polysulfones PSU (including polyphenylsulfones), polyethersulfones (PES), polyether-etherketones (PEEK) and other poly-etherketones, polyimides (PI) including polyether-imide (PEI), polyethylene-terephthalate (PET), polyamides (PA), both aromatic and aliphatic such nylon-6,6, polyamide-imides (PAI), poly-diorganyl siloxanes, such as polydiphenyl and polydimethyl siloxanes, and cellulose esters. Especially suitable are PAI, PI and PEEK. Also composite materials such as PAN-PA are suitable. Suitable support materials include those in use as ultrafiltration membrane material.

The membranes according to the invention can be produced by a process which comprises the steps of:
(i) optionally providing a support, e.g. a mesoporous support;
(ii) contacting a solution of a POSS polyamine having formula 10 in a polar solvent

$(H_2NQ)_m R_{(2n-m)} Si_{2n} O_{3n}$      10 wherein Q, R, m and n are as defined above with respect to formula 2, with a solution of the organic dianhydride in a solvent which is substantially immiscible with said polar solvent to produce a polymer layer in the presence of the support;
(iii) drying and heating the polymer layer to a temperature of at least 180° C.

It was surprisingly found that step (ii) proceeds very smoothly in a short period of time, e.g. between 15 sec and 10 minutes, preferably between 30 sec and 5 minutes.

The solvent to be used for the solution of the POSS polyamine formula 10 can be any polar solvent capable of dissolving or dispersing the amino-substituted cage-like silica groups and essentially immiscible with the low- or non-polar solvent used for dissolving the di- or trianhydride. Preferably the polar solvent is a hydroxylic solvent, such as an alcohol or water or a mixture thereof with or without other polar solvents. The alcohol is preferably a lower alcohol of 1-4 carbon atoms, such as methanol or ethanol. The most preferred polar (hydroxylic) solvent is water. The concentration of the POSS in the polar, preferably aqueous, solution can be e.g. between 0.05 and 5 wt. %, preferably between 0.1 and 2 wt. %.

The dianhydrides to be used in the process of producing the polyimide membranes of the invention have formula 5 depicted above and the trianhydrides have similar corresponding structures exemplified by formula 7. Alternatively, the dianhydrides and trianhydrides can have 6-membered imide rings instead of 5-membered rings, for example in the case of naphthalene-1,4,5,8-tetracarboxylic acid dianhydride or phenalene-1,3,4,6,7,9-hexacarboxylic acid trianhydride. Asymmetric dianhydrides as exemplified by formula 6 can also suitably be used. The use of trianhydrides as exemplified by formula 7 for the polyimide production leads to further cross-linking within the polyimide network. Alternatively or in addition, when producing poly-amide-imide structures containing units of formula 8, the anhydride can be an anhydride or an anhydride-chloride of a tricarboxylic acid such as trimellitic anhydride chloride as described above.

The solvent to be used for dissolving the dianhydride and/or trianhydride is substantially immiscible with the polar solvent (a typical polar solvent being water) and is typically an organic solvent. It can be a hydrocarbon or halogenated hydrocarbon or hydrophobic ether solvent or the like. Most preferred are hydrocarbons of relatively low boiling point such as $C_5$-$C_{10}$, in particular $C_6$-$C_8$ aliphatic, alicyclic or aromatic hydrocarbons, for example, hexane, heptane, octane, toluene or xylenes. Most preferred are toluene and xylenes. The concentration of the dianhydride and/or trianhydride in the hydrocarbon solvent can vary broadly, e.g. between 0.01 and 1 wt. %, in particular between 0.025 and 0.25 wt. %.

The formation of the membrane is achieved by contacting the POSS polyamine solution with the organic solution of the dianhydride (or anhydride-acid halide, or trianhydride etc.) through interfacial polycondensation of the ammonium chloride salt functionalised POSS and a dianhydride etc. Contacting can be achieved, e.g. by first impregnating the porous support with the solution of POSS polyamine as described in step (ii) above. At the interface of the two substantially immiscible solvents containing the monomer reactants, network formation by a polycondensation reaction occurs, resulting in thin polyPOSS-(amic)acid membrane formation. For this purpose the two solvents are considered to be substantially immiscible if the mutual solubility is less than 0.1% (by volume), preferably less than 0.01%, and most preferably less than 0.001%. The water-soluble poly-ammonium POSS in alkaline medium and the dianhydride as the amine and anhydride source respectively react at the interface. Reactant diffusion decreases upon membrane formation, limiting the membrane thickness growth and automatically repairing any defects and pinholes in the layer. This enables formation of freestanding and supported ultrathin polyPOSS-(amic)acid membranes (~100 nm) with ever-growing lateral dimensions.

The initially formed polyPOSS-(amic)acid can be converted to a polyPOSS-imide by heat treatment at temperatures between 180° C. and 350° C., preferably between 225° C. and 325° C., more preferably between 260 and 310° C., either in air or in an inert atmosphere. The high degree of crosslinking allows the macroscopic integrity of the ultrathin layers, with large lateral dimensions, to be retained during heat treatment. Atomic force microscopy (AFM) measurements reveal that the interfacial polymerisation results in the formation of an intrinsically homogeneous distribution of inorganic and organic constituents at a nano-length scale. As described above, this is can be achieved by first contacting the support with the POSS solution, e.g. by saturation, and then contacting the (saturated) support with the di/tri-anhydride solution, causing the condensation reaction to occur at the interface.

The membranes of the invention can be used for various separation purposes, in particular for the separation of small molecules from each other, such as hydrogen, nitrogen, ammonia, lower alkanes and water, in particular hydrogen from other gases such as nitrogen, carbon dioxide or methane, or carbon dioxide from other gases, in particular from methane.

The thin membranes show good gas separation performance at temperatures from ambient temperature up to at least 300° C., which can only be due to the hybrid character of the thin membrane. In the polymers forming such hybrid membranes, organic building blocks are bound to inorganic building blocks. The organic parts are largely hydrocarbon-based, but may further contain elements such as N, O, F and the like, while the inorganic building blocks contain (almost) exclusively elements like Si and O. The silicon atoms act as a linking agent between the two fragments. Hence, the membrane according to the invention can be used for separating gaseous molecules, and also for separating water from organic solvent molecules in the vapour phase.

Preferably, the membrane according to the present invention is used for separating hydrogen from a mixture of gases that may contain methane, carbon dioxide, nitrogen, carbon monoxide, and sulfurous gases including hydrogen sulfide in any molar ratio. Mixtures of gases rich, >30%, in carbon dioxide or methane or nitrogen are of particular interest. Preferably, the separation of hydrogen from the mixture of gases is performed at a temperature of at least 50° C., more preferably at least 80° C., even more preferably at least 100° C., more preferably still at least 150° C., most preferably at least 200° C. Preferably, hydrogen and methane, or hydrogen and nitrogen are separated from each other at a temperature lower than 300° C., most preferably up to 250° C.

In an alternative and equally attractive option, the membrane according to the present invention is used for upgrading methane, by separating carbon dioxide, water or hydrogen sulfide from methane. This process is typically performed at a more modest temperatures between ambient and 150° C., more preferably between 50 and 100° C. The membranes can also be used for separation of carbon dioxide from flue gases.

The membranes of the invention are typically operated at elevated pressure of up to 100 bar.

The membrane according to the invention has a hydrogen to nitrogen and/or a hydrogen to methane selectivity of at least 10:1, in particular at least 25:1, at temperatures up to at least 300° C. These and higher selectivities can especially be attained with membranes based on the more rigid bis-imide groups, i.e. bis-imide groups containing only one aromatic group (e.g. 1,2,4,5-bis(iminodicarbonyl)benzene) or two aromatic groups directly linked to each other (e.g. 3,4,3',4'-bis(iminodicarbonyl)biphenyl or 2,3,6,7-bis(iminodicarbonyl)naphtalene), more in particular for hydrogen/methane, which is highly desired e.g. in gasification processes.

The membrane according to the invention has a carbon dioxide to methane selectivity of at least 5:1, in particular at least 10:1, preferably at least 25:1, more preferably at least 50:1, at pressures up to at least 70 bar. These high selectivities are highly desired e.g. in natural gas winning.

The macroscopic integrity of the ultrathin membranes, with large lateral dimensions, is preserved during heat treatment, as a result of the exceptional high degree of crosslinking. Scanning electron microscopy (SEM) cross sections of the polyPOSS-(amic) acid (A) and poly-POSS-imide (B) on α-alumina discs with a 3 μm thick γ-alumina layer are displayed in FIG. 1. Atomic force microscopy (AFM) topography measurements of the polyPOSS-(amic) acid (B) and polyPOSS-imide (D) reveal height differences typical for interfacial polymerization layers. The change in surface roughness of the polyPOSS-imide (D) is due to curing-induced intrinsic and thermal stresses. The high degree of crosslinking and limited thickness of this layer prevent any pinhole and crack formation that deteriorates the membrane gas separation performance.

Formation of the polyamic(acid)-POSS and subsequent conversion to polyPOSS-imide is confirmed by Fourier transform infrared spectroscopy with attenuated total reflection (FTIR-ATR) absorption spectra. The spectra of non-heat-treated and heat-treated (300° C.) samples show the chemical cyclodehydration of the (amic) acid to imide. The untreated sample has two typical polyamide bands at 1620 and 1570 cm$^{-1}$, for the C=O stretch and N—H bend respectively. After heat treatment, these two bands are substituted by two distinct bands attributed to polyimide C=O symmetric and asymmetric stretch. Quantification of the normalised band intensities of the two polyamic bands at 1570 and 1620 cm$^{-1}$, and the polyimide bands at 1720 and 1780 cm$^{-1}$ show that at treatment temperatures between 0 and 140° C. almost no imidisation occurs. The onset of imidisation is observed between 140 and 160° C., increasing even further up to a temperature of 300° C.

The hybrid characteristics of the material of the invention are manifested in the gas separation performance at elevated temperature. Good gas separation performance at temperatures as high as 300° C. is observed from single gas permeation experiments. Gas permeance shows a decreasing trend with increasing gas molecule kinetic diameter (KD), which is a typical behaviour for glassy polymers: from around $2 \times 10^{-7}$ mol/(m$^2$·s·Pa) for He (KD=2.6 Å) and H$_2$ (KD=2.85 Å) at 200-300° C. to around $10^{-9}$ for N$_2$ (KD=3.6 Å) and CH$_4$ (KD=3.8) at 100° C., or around $10^{-8}$ at 200° C., and around $6 \times 10^{-8}$ at 300° C., for a planar membrane based on 6-FDA (Examples below). Permeance for CO$_2$ at 50° C. is $3 \times 10^{-8}$ mol/(m$^2$·s·Pa). An Arrhenius plot of the permeance on a logarithmic scale as a function of 1/RT shows that the main transport mechanism is activated transport. High selectivity values imply that the imidisation step of the production of the membranes does not induce significant pinholes in the membrane, underlining the high degree of poly-POSS-imide network rigidity. The decrease of selectivity as a function of temperature follows from the difference in activation energies between gases. This results in an increase of H$_2$/CO$_2$ selectivity with temperature, as opposed to what one would normally expect. Most surprisingly, the membranes retain gas selectivities for H$_2$/CH$_4$, CO$_2$/CH$_4$ and H$_2$/N$_2$ around 5 at 200° C. or higher, which is unsurpassed for any polymeric membrane.

BRIEF DESCRIPTION OF THE DRAWINGS

FIGS. 1a, 1b, 1c, and 1d show a Scanning electron microscopy (SEM) image of a 0.1 μm polyPOSS-(amic)acid (top, left) and polyPOSS-imide (bottom, left) layer on α-alumina discs with a 3 μm thick γ-alumina layer. The homogeneous supported films have no apparent crack formation due to drying stresses or heat treatment. The atomic force microscopy (AFM, peak force error) images of the supported polyPOSS-(amic)acid (top, right) shows that film formation results in a smooth layer with hills and valleys with lateral dimensions up to 2 μm. The polyPOSS-imide (bottom, right) layer shows a similar hill-valley structure. An increase in intrinsic and thermal stress induced surface roughness increase ensues from the heat treatment step.

EXAMPLES

General:
Material Characterization

The chemical structure of the poly-POSS-imide was analysed with Attenuated Total Reflection Fourier Transform Infrared Spectroscopy (ATR-FTIR) on free standing membranes using an ALPHA FT-IR Spectrometer (Bruker Optics Inc, Germany) equipped with a ZnSe crystal. All spectra were recorded at room temperature.

Scanning electron microscopy (SEM) images were taken using a LEO-1550 Schottky field emission scanning electron microscope (Carl-Zeiss, Germany).

Atomic Force Microscopy (AFM) measurements were performed using a Multimode 8 AFM instrument equipped with a NanoScope V controller, a vertical engage J-scanner and NanoScope version 8.14 software (Bruker AXS, Santa Barbara, Calif.). Membrane samples were glued to a metal support using a two component epoxy and dried overnight. Image processing and data analysis were performed with NanoScope software version 8.14 and NanoScope Analysis software version 1.40. Peak force tapping was done in air with Si tips on SiN cantilevers (SCANASYST-AIR, Bruker AXS, Camarillo, Calif., nominal spring constant 0.4 N/m). Cantilever spring constants were determined with the thermal noise method. Imaging was done with peak force tapping amplitudes of 150 nm and at scan rates of 0.97 Hz.

Differential scanning calorimetry (DSC) was performed using a Perkin Elmer DSC 8000. Free standing polyPOSS-imide was placed in an aluminum sample pan and cycled from 50 to 300° C. with a heating rate of 20° C./min. Four subsequent heating and cooling cycles were used to prevent influence from sorbed water on the measurement. The three latter heating cycles shown in the figure have a similar profile, with an initial jump in the heat flow due to a lag in the heating of the sample cup and the reference sample. The negative slope of the heat flow is due to the increasing heat capacity as a function of temperature normal for polymer materials.

Thermal gravimetric analysis (TGA) was performed with NETZSCH STA 449 (Germany). Measurements were done on a 1.5 mg sample in alumina pans, under an air and nitrogen atmosphere (70 ml/min), with a heating rate of 10° C./min. The thermal gravimetric evolution of freestanding polyPOSS-imide shows that both under air and nitrogen the onset of weight loss is located above 300° C. In air the sample reaches a constant mass at around 600° C. while for nitrogen weight loss persists even at 1100° C., indicating two distinct degradation mechanisms. Both samples reach a final mass of 35% of the initial mass, having the appearance of a white powder under air and black powder under nitrogen atmosphere.

Membrane single gas permeation experiments were performed in a dead end module at a trans-membrane pressure of 2 bar, and atmospheric pressure at the permeate side. The gases ($N_2$, $CH_4$, $H_2$ and $CO_2$ consecutively) were measured at temperatures between 50 and 300° C. using a Bronkhorst EL-Flow thermal mass flow controller, operated at room temperature. The membranes were pre-heated at a rate of 1.5° C./min under helium atmosphere. Before each measurement a stabilsation time of minimal 30 minutes was used, until the membrane flux was constant. The selectivities of hydrogen over nitrogen and carbon dioxide over methane were determined from the ratio of the permeation values.

Example 1: Preparation of Tubular Membranes

Toluene (anhydrous 99.8%, Sigma-Aldrich), 4,4'-(hexafluoroisopropylidene)diphthalic anhydride (6-FDA, Sigma-Aldrich), ammonium chloride salt functionalised POSS (OctaAmmonium POSS®, Hybrid Plastics, USA) and sodium hydroxide (1M) were used as received. Preparations were performed at ambient temperature and pressure unless otherwise specified.

The pH of a 0.9 wt % solution of octa-ammonium POSS in water (MilliQ), is set to a value of 9.9 using a 1M NaOH solution: solution A. Separately a solution of 0.075% of 4,4'-(hexafluoroisopropylidene)bisphthalic acid dianhydride; 6-FDA) in toluene is prepared: solution B. One open and one closed Teflon cap are attached to the ends of a tubular support of alumina. The open cap is connected to a vacuum pump using a flexible hose. The support tube is immersed in solution A for 30 minutes with the vacuum pump on. The pump is switched off, and the support is removed from solution A and left to dry for 30 minutes. Subsequently the support is placed in solution B for 30 sec or 5 minutes. After this step the tube is rinsed with acetone, and placed in an oven for the imidisation process at 300° C. for 2 hours with heating and cooling rates of 5° C./min. The hydrogen over nitrogen selectivities at 50° and 200° C. were 12 and 15, respectively.

Example 2: Preparation of Planar Membranes

Supported thin membranes were produced on α-alumina discs coated with 3 μm thick γ-alumina (porosity of 60% and a pore size of 2-3 nm). Pre-wetted discs, held fixed on a perforated plate by vacuum, were impregnated with an aqueous solution of 0.9 wt % ammonium chloride salt functionalised POSS (OctaAmmonium POSS®). The pH of this solution was adjusted to 9.9 using sodium hydroxide (0.1M). The discs were then left to dry in a nitrogen atmosphere for 30 minutes and then submersed in the 6-FDA in toluene solution (0.075 wt %). Any unreacted POSS and 6-FDA on the sample surface were removed by acetone and water washes. Samples were dried for 24 hours in a dry nitrogen atmosphere to remove any toluene and unbound water. Samples were imidised by heat treatment in air for two hours at 300° C. with heating and cooling rates of 5° C./min in air. The Example was carried out in triplicate.

The hydrogen over nitrogen and $CO_2$ over $CH_4$ selectivities at 50° and 200° C. are summarised in Table 1. Permeances are summarised in Table 2.

Examples 3-7

The procedure of Example 2 was followed, using different dianhydrides, as follows:

6-FDA: 4,4'-(hexafluoroisopropylidene)bisphthalic acid dianhydride (=2,2-bis(3,4-dicarboxyphenyl)hexafluoropropane dianhydride PMDA: pyromellitic acid dianhydride (=benzene-1,2,4,5-tetracarboxylic acid dianhydride)

BPDA: 4,4'-bisphthalic acid dianhydride (=biphenyl-3,3',4,4'-tetracarboxylic acid dianhydride)

BDPDA: 4,4'-(p-phenylenedioxy)bisphthalic acid dianhydride (=1,4-bis(3,4-dicarboxyphenoxy)benzene dianhydride)

OPDA: 4,4'-oxydiphthalic acid dianhydride (=bis-3,4-dicarboxyphenyl ether dianhydride).

A weight ratio of 0.75 to 1000 of the dianhydride to toluene was used. Example 4 was carried out in triplicate. The parameters and selectivities are summarised in Table 1.

TABLE 1

| Example | Dianhydride | Reaction time (min) | H₂/N₂ selectivity 50° C. | H₂/N₂ selectivity 200° C. | H₂/N₂ selectivity 300° C. | CO₂/CH₄ selectivity 50° C. | CO₂/CH₄ selectivity 200° C. | CO₂/CH₄ selectivity 300° C. |
|---|---|---|---|---|---|---|---|---|
| 2-1 | 6-FDA | 5 | | 22 | | | | |
| 2-2 | 6-FDA | 5 | | 18 | | | 5 | |
| 2-3 | 6-FDA | 5 | 182 | 16 | | 60 | 5 | |
| 3   | 6-FDA | 0.5 | | 18 | | | 5 | |
| 4-1 | PMDA | 5 | 13 | 54 | 33 | | 5 | 6 |
| 4-2 | PMDA | 5 | | 108 | | | | |
| 4-3 | PMDA | 5 | | 76 | | | 10 | |
| 5 | OPDA | 5 | 105 | 41 | 20 | | 4.4 | 4 |
| 6 | BPDA | 5 | 99 | 114 | 57 | 3.3 | 7.3 | 6 |
| 7 | BDPDA | 5 | 6 | 11 | 7 | | | |

Permeances are summarised in Table 2.

TABLE 2

| Example | Dianhydride | Reaction time (min) | Permeance at 200° C. (mol m⁻² s⁻¹ Pa⁻¹) × 10⁻⁹ H₂ | CO₂ | N₂ | CH₄ |
|---|---|---|---|---|---|---|
| 2-1 | 6-FDA | 5 | 180 | | 8.2 | |
| 2-2 | 6-FDA | 5 | 280 | 40 | 16 | 8.0 |
| 2-3 | 6-FDA | 5 | 170 | 48 (*) | 11 | 9.6 |
| 3 | 6-FDA | 0.5 | 480 | 120 | 27 | 24 |
| 4-1 | PMDA | 5 | 74 | 11 | 1.4 | 2.2 |
| 4-2 | PMDA | 5 | 68 | | 0.63 | |
| 4-3 | PMDA | 5 | 48 | 6.9 | 0.63 | 0.69 |
| 5 | OPDA | 5 | 117 | 23 | 2.8 | 5.1 |
| 6 | BPDA | 5 | 68 | 6.1 | 0.60 | 0.84 |
| 7 | BDPDA | 5 | 514 | 158 | 48 | 80 |

(*) at 50° C.: 29 (×10⁻⁹)

REFERENCES

Asuncion et al. 2007, *Macromolecules*, 40, 555-562.
Chern et al., 1991, *J. Appl. Polymer Sc.* 42, 2543-2550.
Chern et al., 1992, *J. Appl. Polymer Sc.* 44, 1087-1093.
Dalwani, M., et al., 2012, *Journal of Materials Chemistry*, 22 (30): p. 14835-14838.
Dasgupta, B. et al., 2010, *Materials Sc. and Engin. B*168, 30-35.
De Vos, R. M. and H. Verweij, 1998, *High-selectivity, high-flux silica membranes for gas separation.* Science, 279 (5357): p. 1710-1711.
Iyer, P. et al. 2010, *J. Membrane Science*, 358, p. 26-32.
Koros, W. J. and D. G. Woods, 2001, *Elevated temperature application of polymer hollow fiber membranes.* Journal of Membrane Science, 181 (2): p. 157-166.
Jiang et al., 2009, *Progress Polymer Sc.* 34, 1135-1160.
Verker, R, et al., 2009, *Composites Sc. Technol*, 69. 2178-2184, Polymer 2007, 48, 19,
Yuan, F., et al., 2007, *J. Membrane Science*, 421-422: p. 327-341.
Zheng, H. B. and Z. Y. Wang, 2000, *Macromolecules* 33, 4310-12.

The invention claimed is:

1. A process of producing a hybrid organic-inorganic polyimide membrane having a thickness of 500 nm or less, wherein the polyimide is a network of alternating (a) bis-imide and/or tris-imide units and (b) polyhedral oligomeric silsesquioxane (POSS) groups, comprising:

(i) contacting a solution of a POSS polyamine having the following formula

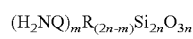

$(H_2NQ)_m R_{(2n-m)} Si_{2n} O_{3n}$ or its acid-addition salt in a polar solvent,
wherein
Q is $C_p H_q$ bound to a silicon atom,
R is hydrogen, hydroxy or $C_1$-$C_4$ alkyl, alkoxy, hydroxyalkyl, aminoalkyl or optionally N-alkylated ammonioalkyl, bound to a silicon atom,
m is from 2 up to 2n,
n is from 2 up to 6,
p=1 to 6,
q=2(p−r) with r=0 to 4 and r<p; and
x is from 0 to 2n−1,
with a solution of a organic dianhydride of the following formula or its corresponding trianhydride,

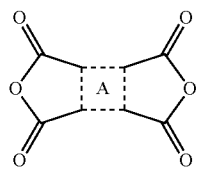

in an organic solvent which is immiscible with said polar solvent, to produce a polymer layer;
(ii) drying and heating the polymer layer to a temperature of at least 180° C.

2. The process according to claim 1, wherein the polar solvent comprises water.

3. A method for separating gaseous molecules from a gas mixture, comprising subjecting a gas mixture to a membrane produced by a process according to claim 1.

4. The method according to claim 3, wherein hydrogen is separated from a gas mixture comprising at least one gas selected from carbon dioxide, carbon monoxide, methane, nitrogen and hydrogen sulphide.

5. The method according to claim 4, wherein the gas mixture comprises carbon dioxide or methane.

6. The method according to claim 5, wherein the gas mixture has a temperature between 50 and 300° C.

7. The method according to claim 5, wherein the gas mixture has a pressure between 5 and 100 bar.

8. The method according to claim 3, wherein carbon dioxide is separated from a gas mixture comprising methane or nitrogen.

9. The process according to claim 1, wherein the organic solvent is selected from $C_5$-$C_{10}$ aliphatic, alicyclic or aromatic hydrocarbons.

10. The process according to claim 1, wherein A is selected from ethylene, ethylidene, optionally substituted alicyclic and aromatic ring systems, and combinations of two or three of said ring systems, optionally linked by $C_1$-$C_4$ alkylidene or halo-alkylidene, ether, carbonyl, sulfide or sulfone bonds.

11. The process according to claim 1, wherein the dianhydrides are selected from the dianhydrides of tetracarboxylic acids of ethylene, alkanes, cycloalkanes, heterocycloalkanes, aromatic, heteroaromatic and polyaromatic ring groups and their hydrogenated and/or halogenated analogues.

12. The process according to claim 1, wherein A represents a ring system selected from benzene, naphthalene, phenalene, anthracene, phenanthrene, biphenyl, biphenylene, triphenylene, fluorene, diphenyl ether, diphenyl sulfide and diphenyl sulfone, benzophenone, diphenyl $C_1$-$C_4$ alkanes, dibenzofuran, xanthenes, diphenoxybenzene, terphenyl, and their hydrogenated and/or halogenated analogues.

13. The process according to claim 12, wherein the ring system is selected from benzene, naphthalene, biphenyl, biphenylene, fluorene, diphenyl ether, diphenyl $C_1$-$C_3$ alkanes, and their hydrogenated and/or halogenated analogues.

14. The process according to claim 13, wherein the ring system is selected from benzene, biphenyl, and hexafluoro-2,2-diphenylpropane.

15. The process according to claim 1, wherein the bisimide units to silicon atoms are in a molar ratio between 0.25 and 0.5.

16. The process according to claim 1, wherein the membrane has a thickness between 20 and 500 nm.

17. The process according to claim 1, wherein the membrane has a hydrogen to nitrogen and/or a hydrogen to methane selectivity of at least 5:1 up to a temperature of at least 300° C.

18. The process according to claim 17, wherein the membrane has a hydrogen to nitrogen and/or a hydrogen to methane selectivity of at least 10:1 up to a temperature of at least 300° C.

19. The process according to claim 1, wherein the membrane has a nitrogen permeance at 200° C. of at least $0.6 \times 10^{-9}$ mol·m$^{-2}$·s$^{-1}$·Pa$^{-1}$.

20. The process according to claim 18, wherein the membrane has a nitrogen permeance at 200° C. of at least $68 \times 10^{-9}$ mol·m$^{-2}$·s$^{-1}$·Pa$^{-1}$.

21. The process according to claim 1, further comprising providing a support.

22. The process according to claim 21, wherein the support is a mesoporous or microporous ceramic support, or an organic polymeric support, or a porous metallic support.

* * * * *